(12) United States Patent  
Graessley et al.

(10) Patent No.: US 9,407,701 B2  
(45) Date of Patent: Aug. 2, 2016

(54) ADDRESS FAMILY PREFERENCE IN MULTIPLE NETWORK INTERFACE ENVIRONMENTS

(71) Applicant: Apple Inc., Cupertino, CA (US)

(72) Inventors: Joshua V. Graessley, San Jose, CA (US); Stuart Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 727 days.

(21) Appl. No.: 13/715,737

(22) Filed: Dec. 14, 2012

(65) Prior Publication Data

US 2014/0173123 A1 Jun. 19, 2014

(51) Int. Cl.
| | |
|---|---|
| *G06F 15/16* | (2006.01) |
| *H04L 29/08* | (2006.01) |
| *H04L 29/12* | (2006.01) |
| *H04W 48/18* | (2009.01) |
| *H04W 88/06* | (2009.01) |

(52) U.S. Cl.
CPC .......... *H04L 67/14* (2013.01); *H04L 61/1511* (2013.01); *H04L 61/6077* (2013.01); *H04L 61/6086* (2013.01); *H04L 67/141* (2013.01); *H04W 48/18* (2013.01); *H04W 88/06* (2013.01)

(58) Field of Classification Search
CPC .......... H04L 61/1511; H04L 61/6059; H04L 61/6077; H04L 61/6086; H04L 67/141; H04L 67/14; H04W 48/18; H04W 88/06
USPC ........................................ 709/228, 240, 245
See application file for complete search history.

(56) References Cited

U.S. PATENT DOCUMENTS

| | | | |
|---|---|---|---|
| 6,744,774 B2 | 6/2004 | Sharma | |
| 7,620,732 B2 * | 11/2009 | Ishihara et al. | 709/241 |
| 2006/0028998 A1 * | 2/2006 | Lioy et al. | 370/252 |
| 2006/0092134 A1 * | 5/2006 | Ohara | 345/161 |
| 2006/0095585 A1 * | 5/2006 | Meijs et al. | 709/245 |
| 2007/0011326 A1 | 1/2007 | Ohara | |
| 2007/0280154 A1 * | 12/2007 | Gupta et al. | 370/328 |
| 2008/0196098 A1 * | 8/2008 | Cottrell et al. | 726/12 |
| 2009/0037595 A1 | 2/2009 | Breau et al. | |
| 2009/0161670 A1 * | 6/2009 | Shepherd et al. | 370/389 |
| 2010/0082444 A1 * | 4/2010 | Lin et al. | 705/17 |

(Continued)

FOREIGN PATENT DOCUMENTS

WO    2011148234 A1    12/2011

OTHER PUBLICATIONS

Configuring DNS for IPv6/1Pv4 Coexistence, Mar. 28, 2003, http://technet.microsoft.com/en-us/cct38372(d=printer, v=ws.10).aspx.*
Draves, R. "Default Address Selection for Internet Protocol version 6 (IPv6)," The Internet Society, Network Working Group, Standards Track, Request for Comments 3484, Feb. 2003, 25 pages.
Draves, R. "Default Address Selection for Internet Protocol Version 6 (IPv6)": rfc3484.text, 20030201, Feb. 1, 2008 XP015009267, ISSN: 000-0003, paragraphs [0001], [0002], [0003], [0006], [0007], [0008].

(Continued)

*Primary Examiner* — Lance L Barry
(74) *Attorney, Agent, or Firm* — Sterne, Kessler, Goldstein & Fox PLLC (57) ABSTRACT

Internet protocol (IP) addresses are received from one or more domain name service (DNS) servers for accessing a remote host in response to a DNS query. The IP addresses are prioritized based on a list of preferred network interfaces associated with a plurality of networks. A network connection is established with the remote host using the most prioritized one of the IP addresses and a network protocol associated with the most prioritized IP address, where the most prioritized IP address is routable to reach the remote host over a network via the most preferred network interface.

23 Claims, 6 Drawing Sheets

(56) References Cited

U.S. PATENT DOCUMENTS

2010/0083121 A1* 4/2010 Famolari et al. ............. 715/736
2010/0235431 A1   9/2010 Poluri et al.
2013/0078985 A1* 3/2013 Savolainen et al. ........... 455/418
2013/0332562 A1* 12/2013 Naidu et al. ................. 709/217
2014/0173123 A1* 6/2014 Graessley et al. ............. 709/228

OTHER PUBLICATIONS

PCT Notification of Transmittal of the International Search Report and the Written Opinion of the International Searching Authority, or the Declaration. (Mail Date Jan. 15, 2014 PCT/US2013/066196).

* cited by examiner

ADDRESS FAMILY PREFERENCE IN MULTIPLE NETWORK INTERFACE ENVIRONMENTS

FIELD OF THE INVENTION

Embodiments of the present invention relate generally to networking. More particularly, embodiments of the invention relate to network address family preference in multi-network environments.

BACKGROUND

The Internet is moving from Internet protocol (IP) version 4 (IPv4) to IP version 6 (IPv6). Some networks can support IPv4 only; some networks can support both IPv4 and IPv6 address families; and some networks support IPv6 only. Devices such as mobile phones can support multiple network interfaces such as cellular and WiFi. Some of those network interfaces may have different address families (IPv4/IPv6) available. Some devices prefer WiFi to cellular for power and cost reasons.

In a conventional implementation of a network stack that supports both IPv4 and IPv6 address families and multiple network interfaces where one interface may be preferred over another, mixing address families presents a challenge. Most applications attempt to connect to a host by hostname and port. That hostname is resolved using domain name service (DNS) to both IPv4 and IPv6 addresses. Most network stacks designate a default gateway for each address family (IPv6 and IPv4). In some cases, the preferred interface may be WiFi but WiFi only supports IPv4 while cellular supports both IPv4 and IPv6. When this happens, some systems may set a default route for IPv4 to go out via WiFi and the default route for IPv6 to go out via cellular. A conventional implementation will not take this routing into account when sorting address returned from DNS.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, the IP addresses are prioritized based on the preferred network interfaces. If the most preferred network interface only support IPv4 address scheme, an IPv4 address is preferred over an IPv6 address. In this situation, the IPv6 addresses may be utilized only if there are no IPv4 addresses. Thus, the network interface preferences have a higher priority than the IP address family preferences (e.g., IPv4 vs. IPv6 address families). According to one embodiment, when a first IP address received and the first IP address is not supported by a preferred network interface, processing logic may wait for a predetermined period of time hopefully to receive a second IP address that is supported by the preferred network interface. Only if the second IP address cannot be received within the period of time, it falls back to a secondary network interface (e.g., less preferred network interface) using the first IP address. The waiting period of time may be determined based on prior routing statistics. The network interface preferences may be configured by a user or an administrator via a user interface and stored in a persistent storage of the device or alternatively hardcoded by design.

Figure 1:
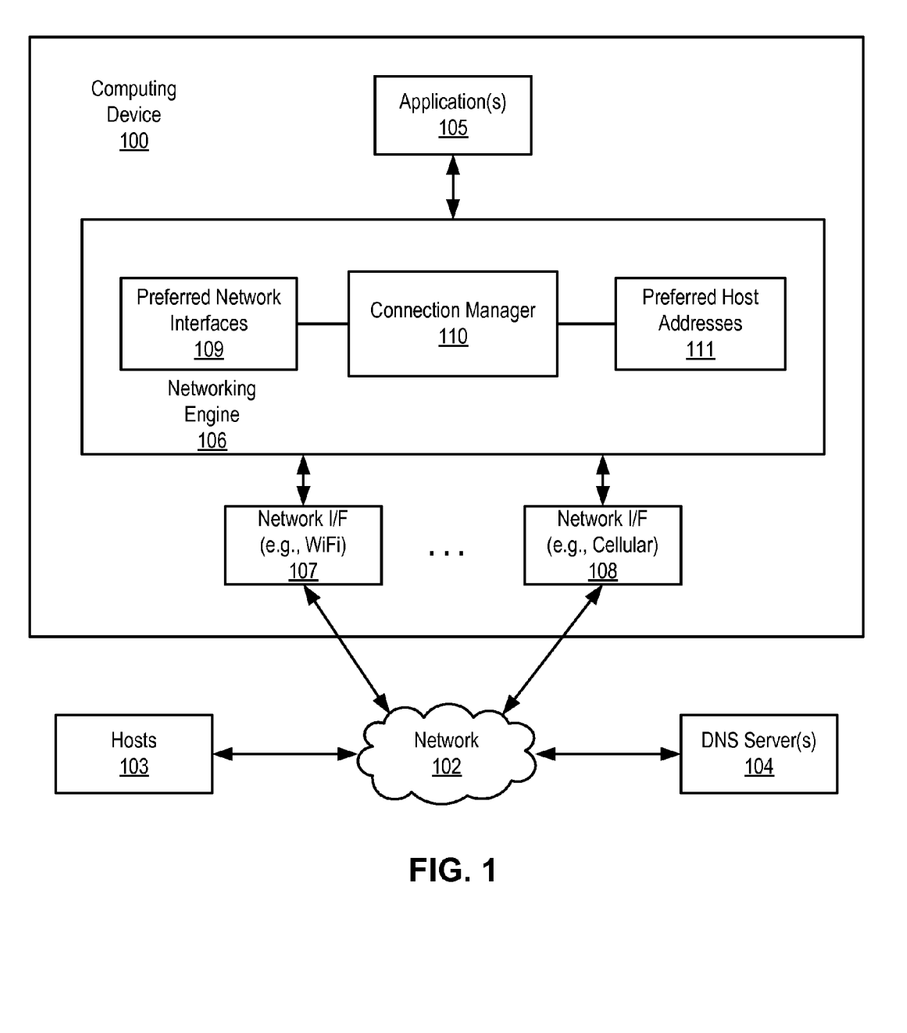
FIG. 1 is a block diagram illustrating an example of a computing device according to one embodiment of the invention.

FIG. 1 is a block diagram illustrating an example of a computing device according to one embodiment of the invention. Referring to FIG. 1, device 100 may represent any kind of computing devices that can communicate over a network. For example, device 100 may be a mobile phone (e.g., iPhone™), a laptop (e.g., MacBook™), a tablet (e.g., iPad™), a personal digital assistant (PDA), a desktop (e.g., iMac™), a gaming device, a media player (e.g., iPod™ or iPod Touch™), etc. In this example, device 100 is communicatively coupled to hosts 103 and one or more DNS servers 104 over network 102. Network 102 may represent any kinds of networks, such as a local area network (LAN), a personal area network (PAN), a wide area network (e.g., the Internet), or a combination thereof, wired and/or wireless. For example, network 102 may represent IEEE 802.3-based networks (Ethernet networks), IEEE 802.11-based networks (e.g., also referred to as "WiFi" networks), and/or wireless cellular data networks (e.g., such as GPRS, 3G, or 4G/LTE networks). Hosts 103 may represent any Internet sites. For some large Internet hosts such as google.com, apple.com, or yahoo.com, there may be multiple IP addresses of multiple address families (e.g., IPv4, IPv6) associated with the sites. Thus, device 100 can access hosts 103 using multiple IP addresses provided by one or more DNS servers 104 over one or more networks of different types.

In one embodiment, device 100 includes one or more applications or programs 105 communicatively coupled to network ending 106 to access network 102 over one or more of network interfaces 107-108. Networking engine 106 may be implemented as part of a network stack or a separate component of an operating system running within device 101. In one embodiment, networking engine 106 includes a connection manager 110 configured to manage network connections on behalf of applications 105. Connection manager 110 maintains a preferred host addresses 111 storing a list of preferred IP addresses to a host or hosts. The stored IP addresses are prioritized based on preferred network interfaces 109. An IP address that is supported (e.g., routable) by a more preferred network interface (e.g., WiFi) is listed with a priority higher than the one that is supported by a less preferred network interface (e.g., cellular).

Figure 4:
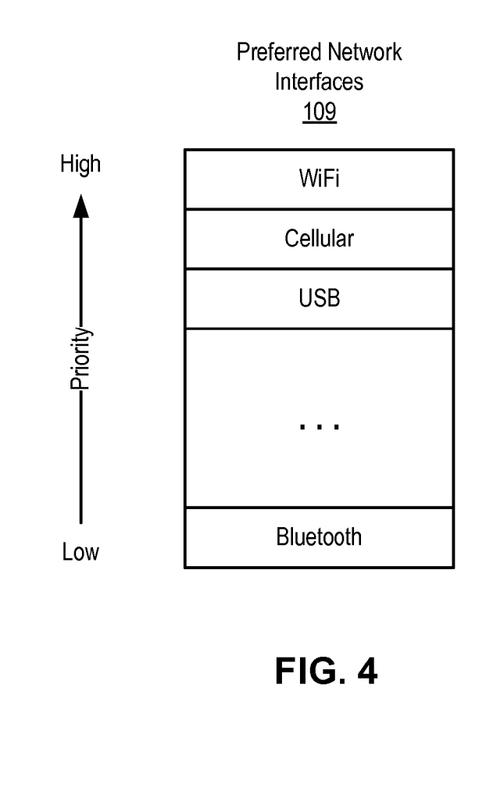
FIG. 4 shows an example of a data structure storing preferred network interfaces according to one embodiment of the invention.

In one embodiment, in response to a request received from application 105 to access host 103, a DNS query having a hostname of host 103 is sent to one or more DNS servers 104. When connection manager 110 receives a DNS response or responses from DNS servers 104, the IP addresses associated with host 104 are extracted from the DNS responses and stored in preferred host addresses 111, and the IP addresses are sorted based on preferred network interfaces 109. An IP address that is most preferred or has the highest priority is then utilized to access host 103. Network interfaces 107-108 may include, for example, WiFi, cellular, near field communications (NFC) such as Bluetooth, and/or universal serial bus (USB) interfaces. Thus, device 100 may support multiple network interfaces 107-108 and network interfaces 107-108 may be prioritized in a preferred order and stored as part of preferred network interfaces 109 (as shown in FIG. 4), which may be user configurable or hardcoded.

Figure 2:
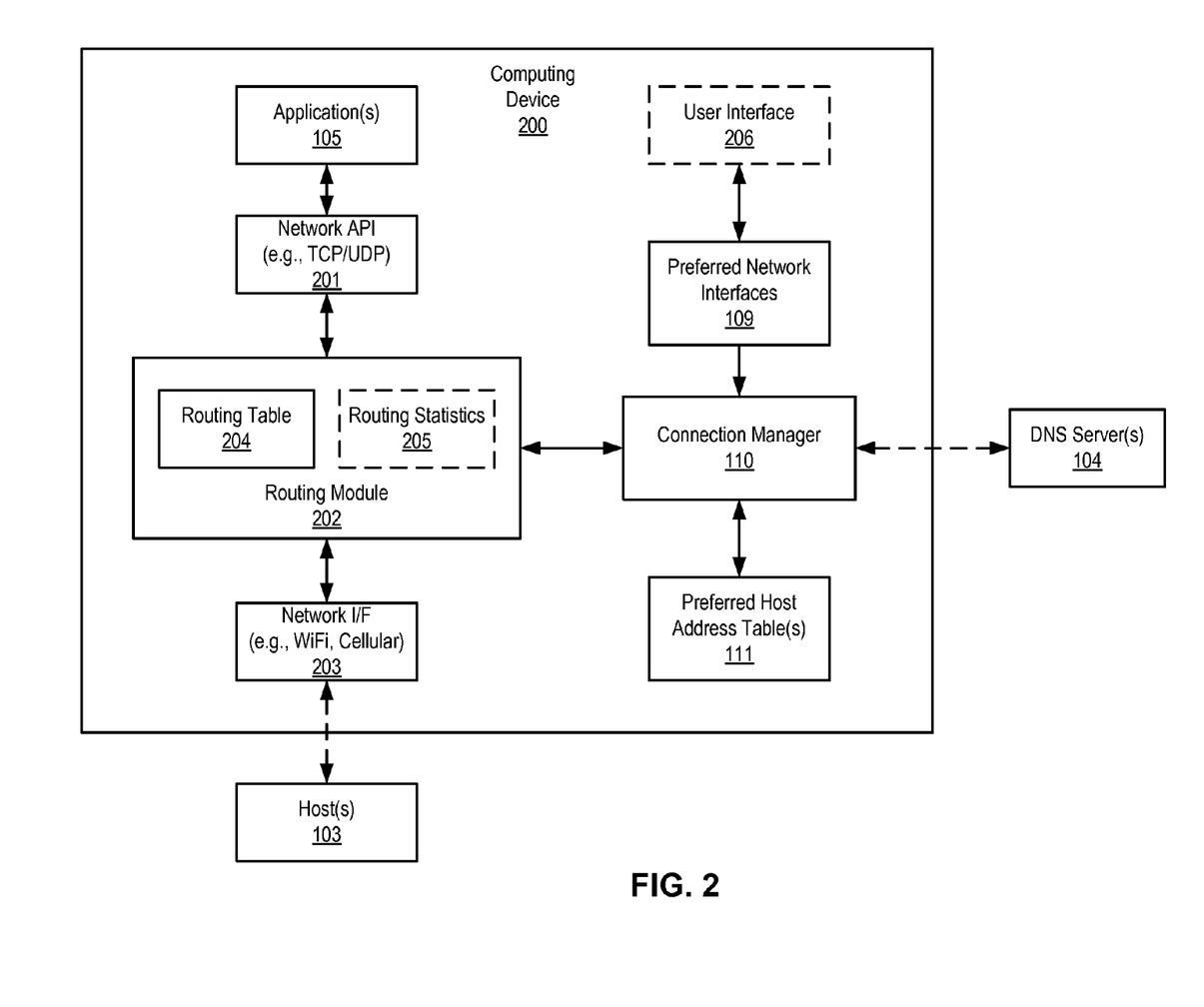
FIG. 2 is a block diagram illustrating a computing device according to another embodiment of the invention.

FIG. 2 is a block diagram illustrating a computing device according to another embodiment of the invention. Device 200 may be implemented as part of device 100 of FIG. 1. Referring to FIG. 2, when application 105 (e.g., browser application) attempts to access host 103, it communicates with routing module 202 via network application programming interface (API) to request accessing host 103, for example, by providing a hostname (e.g., apple.com) and a port (e.g., port 80). Network API 201 may be provided by an operating system of device 200. In response to the request, routing module 202 consult its routing table 204 based on the hostname to determine whether routing table 204 includes an IP address of the requested hostname. If routing table 204 does not contain a proper IP address for the requested host 103, routing module 202 communicates with connection manager 110 to contact one or more DNS servers 104 to obtain an IP address or addresses associated with host 103. Routing module 202 and connection manager 110 may be a part of networking engine 106 of FIG. 1. For example, connection manager 110 may transmit a DNS query to DNS server(s) 104 and receives a response or responses from DNS server(s) 104 that include one or more IP addresses associated with host 103.

As described above, multiple IP addresses may be assigned to a given host. Each of the assigned IP addresses may be utilized to access the host, although one IP address may have a better performance than another. Some of the IP addresses may be IPv4 compatible addresses or IPv6 compatible addresses. However, some of the networks (e.g., WiFi) may or may not support the IPv6 addressing scheme dependent upon the specific network configurations. IPv6 is a version of the IP suite that is designed to succeed IPv4, which is currently in widespread use across the Internet. IPv6 uses a larger address space which is largely incompatible with IPv4. As such, if a particular host on the Internet supports both IPv4 and IPv6, the networking routes for used IPv4 may be completely different than those used for IPv6 (i.e., different gateways, subnets, etc). Moreover, the fact that IPv6 is newer does not necessarily mean that it will result in better performance than IPv4, particularly given the limited support for IPv6 and, in contrast, the widespread use of IPv4. IPv4 and IPv6 employ different forms of DNS queries. Specifically, an IPv4 DNS query is referred to as an "A-record query" and an IPv6 DNS query is referred to as a "quad-A record query." The A-record query and the quad-A record query may be separately sent to the same or different DNS servers, and IP addresses of different address families may be received from the same or different DNS servers.

According to one embodiment, when connection manager 110 receives multiple IP addresses associated with one or more address families (e.g., IPv4 and/or IPv6), connection manager 110 stores the IP addresses in preferred host address table 111. Connection manager 110 may further identify the network interfaces in which each IP address is supported or routable. Connection manager 110 further prioritizes or sorts the IP addresses in preferred host addresses 111 based on network interfaces associated with the IP addresses. In one embodiment, the IP addresses are prioritized according to a list of preferred network interfaces 109.

Figure 3:
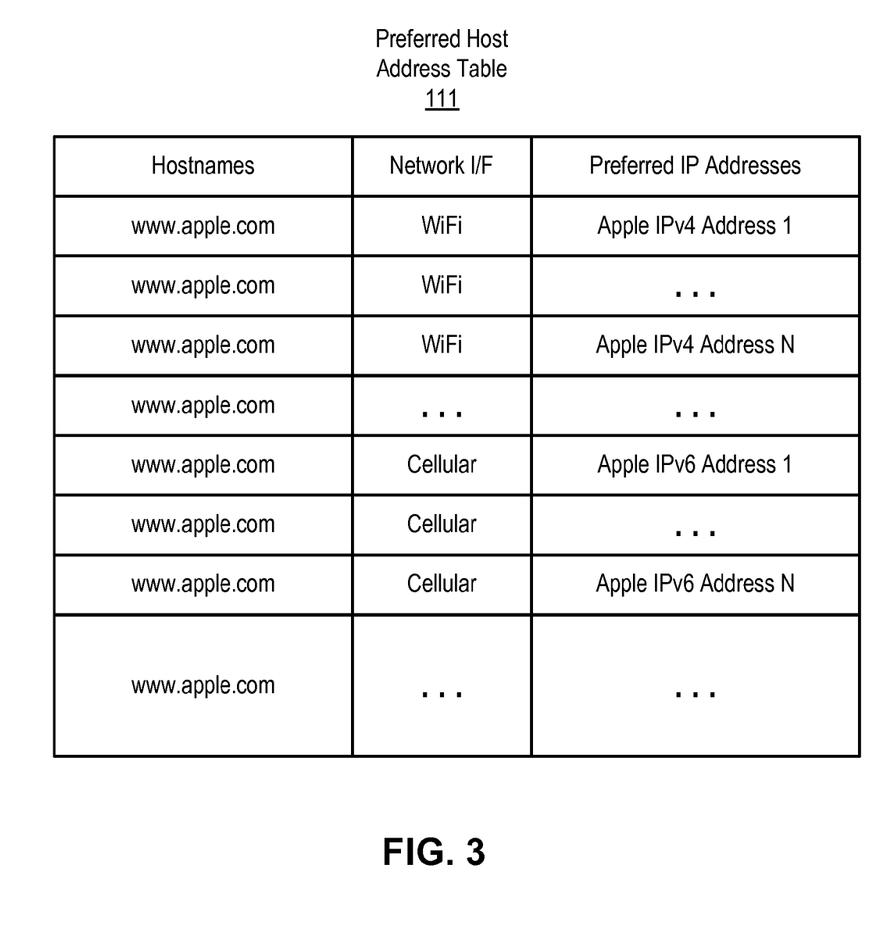
FIG. 3 shows an example of a data structure storing preferred host addresses according to one embodiment of the invention.

According to one embodiment, an example of preferred network interfaces 109 is shown in FIG. 4, while an example of preferred host address table 111 is shown in FIG. 3. Preferred network interfaces 109 are sorted according to a user or administrator preference, which may be configured statically or dynamically via a user interface 206. Referring to FIG. 4, in this example, WiFi network interface has the highest priority while Bluetooth network interface has the lowest priority. That means, if possible, the user prefers to access data network via a WiFi interface. Referring to FIG. 3, the IP addresses are sorted based on the network interface preferences as shown in FIG. 4. Note that multiple IP addresses of the same address family may be received from the DNS server(s). In this example, there may be multiple IPv4 addresses and multiple IPv6 addresses received from the DNS server(s). Some of these IP addresses may have a better performance for accessing the host (e.g., faster round trip time) compared with other IP addresses.

Referring to FIGS. 2 and 3, the addresses may be sorted further based on routing statistics 205 collected over a period of time. An address of a particular address family may be ranked higher than another address of the same address family based on the routing statistics 205. An address that is supported or routable by the most preferred network interface and/or ranked with the highest performance amongst the addresses within the same address family is then populated in routing table 204 and is utilized to route subsequent packets between application 105 and host 103 via the most preferred one of network interface 203. Note that device 100 may include multiple interfaces with the same address family (e.g., IPv4 interface for both WiFi and cellular). Device 100 may be set up to route traffic to certain subnets over different interfaces. In such a scenario, those IP addresses of the same address family may still be sorted based on which ones will be routed over the preferred interface.

According to one embodiment, the network engine further includes a network traffic monitor (not shown) monitors statistics associated with the network connections to each host and subnet and subsequently utilizes the network statistics when establishing subsequent connections. For example, when the networking engine opens a TCP socket connection to a remote host, it may track networking statistics including, but not limited to, number of packets in/out, number of bytes in/out, number of duplicate bytes received, number of out of order bytes received, number of retransmitted bytes, number of connection attempts, number of successful connections established, minimum round trip time, average round trip time, and average bandwidth. It should be noted however, that the underlying principles of the invention are not limited to any particular set of networking statistics. These values can subsequently be evaluated, either alone or in combination, to determine a "quality level" associated with the TCP socket. Once the quality has been determined for a set of potential host addresses (e.g., provided via a DNS query), a prioritized list may be generated and routing entries having relatively higher priorities may be used to establish the connection. For example, in one embodiment, an attempt is made to connect to one or more of the highest priority of the set of host addresses first. If a connection is unsuccessful within a designated time period, then the networking engine may attempt the next set of one or more highest priority host address on the list.

In addition to maintaining statistics for each individual host address, one embodiment of the invention accumulates the statistics for hosts on the same subnet and generates cumulative statistics for the subnet addresses. The accumulated statistics, as part of routing statistics 205, may then be used to select a particular subnet (e.g., when cloning the routing data from a particular subnet). Moreover, in one embodiment, the techniques described herein are employed with both IP version 4 (IPV4) network addresses and IP version 6 (IPV6) network addresses. Consequently, if a computing device receives both IPV4 and IPV6 addresses in response to a DNS query, it may choose the one which provides the best connectivity to the host (i.e., the route with the highest "quality" level).

In one embodiment, when connection manager 110 receives a first address from DNS server(s) 104, if the first address is supported or routable via the most preferred network interface, WiFi in the example as shown in FIG. 4, connection manager 110 may use first address to establish a connection with host 103. Connection manager 110 may wait for a period of time to possibly receive multiple addresses that are supported by the most preferred network interface before selecting one of them to establish the connection. If the first address is not supported or routable via the most preferred network interface, in one embodiment, connection manager 110 may delay for a predetermined period of time in an attempt to obtain a second address that is supported or routable via the most preferred network interface. Only if there is no address in return that is supported by the most preferred network interface, connection manager 110 falls back to an address that is supported by the next most preferred network interface. The waiting period of time may be determined based on the statistics 205.

Figure 5:
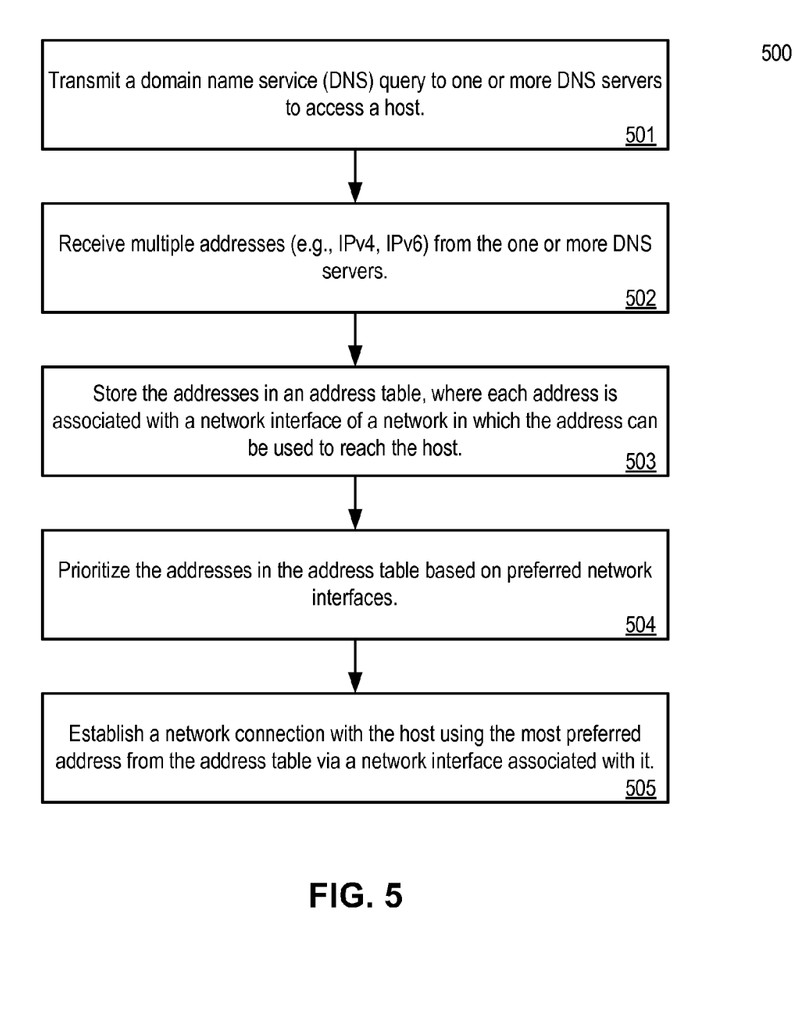
FIG. 5 is a flow diagram illustrating a method for establishing a network connection with a host according to one embodiment.

FIG. 5 is a flow diagram illustrating a method for establishing a network connection with a host according to one embodiment. Method 500 may be performed by device 200 of FIG. 2, which may be performed by processing logic implemented in software, hardware, or a combination thereof. Referring to FIG. 5, in response to a request to establish a network connection with a host, at block 501, processing logic transmits a DNS query to one or more DNS servers for an address associated with the host. At block 502, processing logic receives multiple addresses (e.g., IPv4, IPv6) from the DNS servers. At block 503, the addresses are stored in an address table associated with the host. Each address is associated with a network interface (I/F) of the device that can access a network in which the corresponding address can be used to reach the host. At block 504, the addresses of the address table are prioritized based on a set of preferred network interfaces. At block 504, a network connection is established with the host using the most preferred address from the address table via a network interface associated with it.

Figure 6:
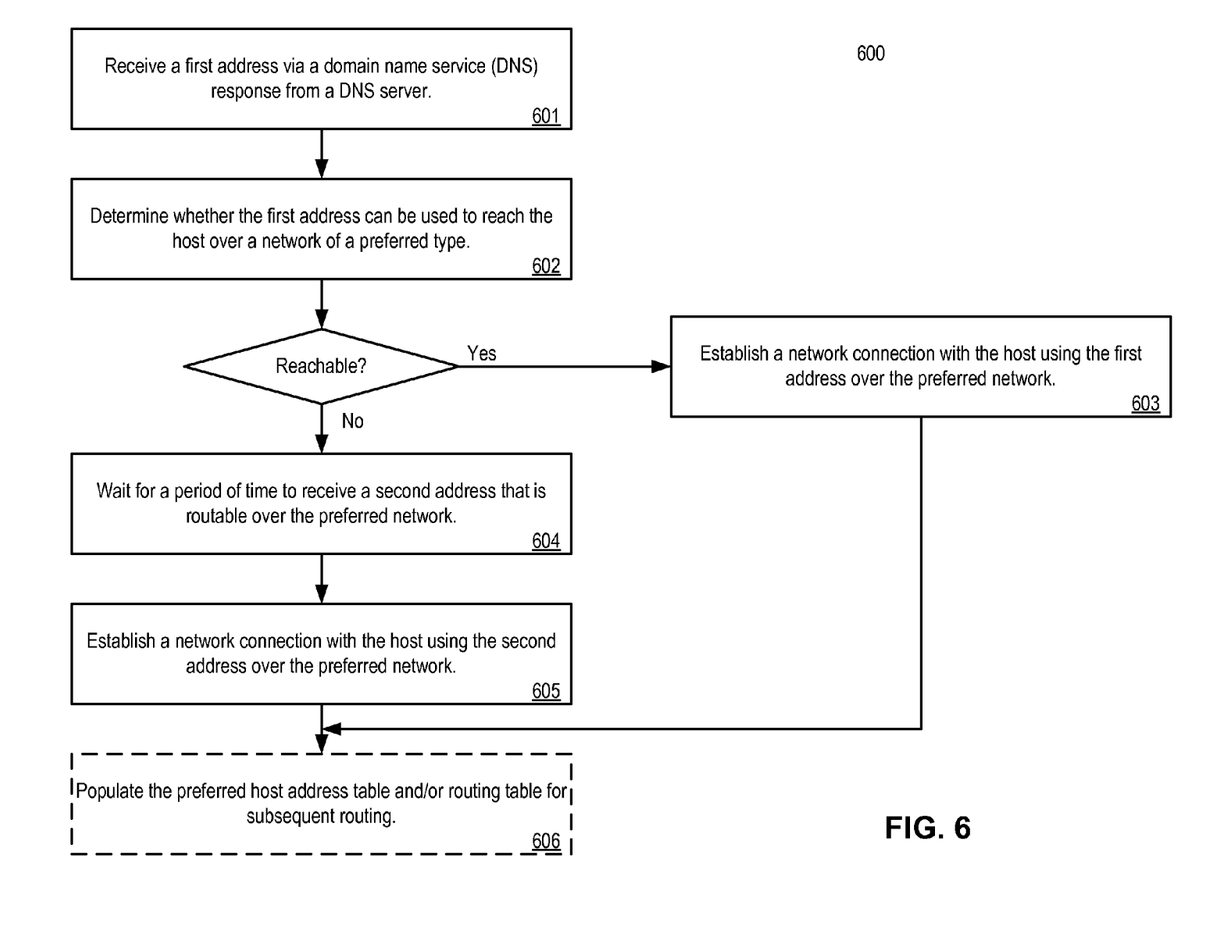
FIG. 6 is a flow diagram illustrating a method for establishing a network connection with a host according to another embodiment.

FIG. 6 is a flow diagram illustrating a method for establishing a network connection with a host according to one embodiment. Method 600 may be performed by device 200 of FIG. 2, which may be performed by processing logic implemented in software, hardware, or a combination thereof. Referring to FIG. 6, at block 601, processing logic receives a first address from a DNS server as part of a DNS response to a DNS query. At block 602, processing logic determines whether the first address can be used to reach the host over a network of the most preferred type. If so, at block 603, a network connection is established with the host using the first address over the most preferred network. If the first address is not supported by the most preferred network, at block 604, processing logic waits for a predetermined period of time to receive a second address from the DNS server that is routable over the most preferred network. At block 605, a network connection is established with the host using the second address. Thereafter, at block 606, the address selected for the network connection is populated in a preferred host address table and/or a routing table for subsequent routing.

Figure 7:
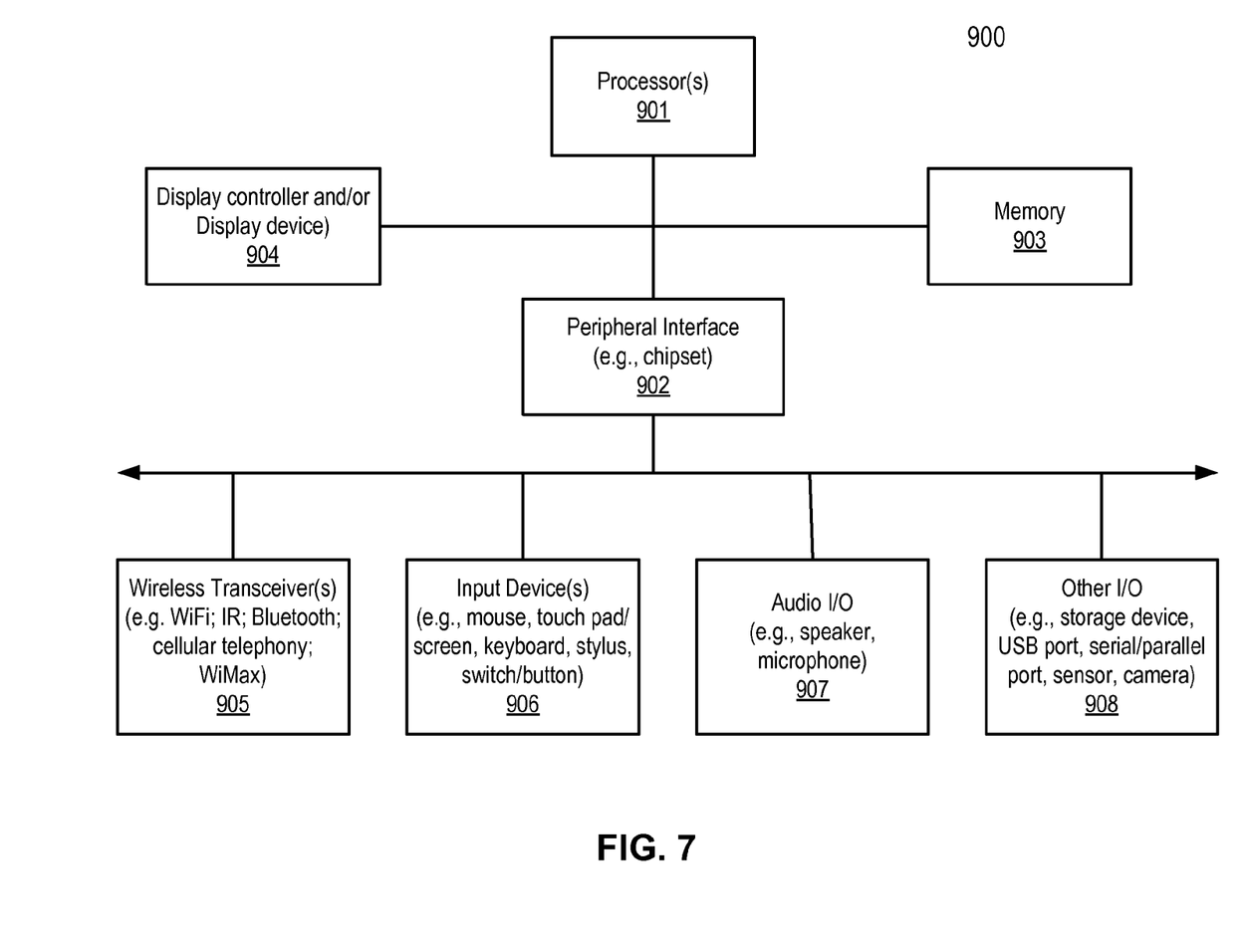
FIG. 7 is a block diagram illustrating an example of a data processing system which may be used with one embodiment of the invention.

FIG. 7 is a block diagram illustrating an example of a data processing system which may be used with one embodiment of the invention. For example, system 900 may represents any of data processing systems described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 7, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a plurality of Internet protocol (IP) addresses from a domain name service (DNS) server for accessing a remote host in response to a DNS query, wherein the plurality of IP addresses include an IP address from a first IP address family and an IP address from a second IP address family;
   sorting the plurality of IP addresses based on a list of preferred network interfaces and IP address family support for the list of preferred network interfaces, wherein the list of preferred network interfaces includes a first network interface supporting the first IP address family and a second network interface supporting the second IP address family;

selecting an IP address from the plurality of IP addresses and a network interface associated with the selected IP address based on the sorting; and establishing a network connection with the remote host via the selected network interface using the selected IP address, wherein the selected IP address is routable to reach the remote host over a network via the selected network interface.

2. The method of claim 1, wherein the list of preferred network interfaces includes at least a WiFi network and a cellular network.

3. The method of claim 2, wherein the list of preferred network interfaces is user configurable and prioritized in a preferred order.

4. The method of claim 1, wherein the plurality of IP addresses includes an IP version 4 (IPv4) address and an IP version 6 (IPv6) address that are associated with the remote host.

5. The method of claim 1, wherein sorting the plurality of IP addresses based on the list of preferred network interfaces and IP address family support for the list of referred network interfaces comprises:

storing the plurality of IP addresses in a plurality of entries of a preferred host address table associated with the remote host, each entry being associated with a network interface; and sorting the plurality of entries of the preferred host address table based on the list of preferred network interfaces.

6. The method of claim 1, wherein receiving the plurality of IP addresses from the DNS server comprises:

receiving a first IP address from the DNS server;

determining whether the first IP address is routable over the most preferred network;

delaying a predetermined period of time to receive a second IP address from the DNS server, if the first IP address is not routable over the most preferred network; and establishing the network connection with the remote host using the second IP address.

7. The method of claim 6, further comprising immediately establishing the network connection using the first IP address without waiting for the second IP address, if the first IP address is routable over the most preferred network.

8. The method of claim 6, wherein the predetermined period of time is determined based on prior network routing statistics.

9. A non-transitory computer-readable medium having instructions stored therein, which when executed by a computer, cause the computer to perform a method, the method comprising:

receiving a plurality of Internet protocol (IP) addresses from a domain name service (DNS) server for accessing a remote host in response to a DNS query, wherein the plurality of IP addresses include an IP address from a first IP address family and an IP address from a second IP address family;

sorting the plurality of IP addresses based on a list of preferred network interfaces and IP address family support for the list of preferred network interfaces, wherein the list of preferred network interfaces include a first network interface supporting the first IP address family and a second network interface supporting the second IP address family;

selecting an IP address from the plurality of IP addresses and a network interface associated with the selected IP address based on the sorting; and establishing a network connection with the remote host via the selected network interface using the selected IP address, wherein the selected IP address is routable to reach the remote host over a network via the selected network interface.

10. The non-transitory computer-readable medium of claim 9, wherein the list of preferred network interfaces includes at least a WiFi network and a cellular network.

11. The non-transitory computer-readable medium of claim 10, wherein the list of preferred network interfaces is user configurable and prioritized in a preferred order.

12. The non-transitory computer-readable medium of claim 9, wherein the plurality of IP addresses includes an IP version 4 (IPv4) address and an IP version 6 (IPv6) address that are associated with the remote host.

13. The non-transitory computer-readable medium of claim 9, wherein sorting the plurality of IP addresses based on the list of preferred network interfaces and IP address family support for the list of preferred network interfaces comprises:

storing the plurality of IP addresses in a plurality of entries of a preferred host address table associated with the remote host, each entry being associated with a network interface; and sorting the plurality of entries of the preferred host address table based on the list of preferred network interfaces.

14. The non-transitory computer-readable medium of claim 9, wherein receiving the plurality of IP addresses from the DNS server comprises:

receiving a first IP address from the DNS server;

determining whether the first IP address is routable over the most preferred network;

delaying a predetermined period of time to receive a second IP address from the DNS server, if the first IP address is not routable over the most preferred network; and establishing the network connection with the remote host using the second IP address.

15. The non-transitory computer-readable medium of claim 14, wherein the method further comprises establishing the network connection using the first IP address without waiting for the second IP address, if the first IP address is routable over the most preferred network.

16. The non-transitory computer-readable medium of claim 14, wherein the predetermined period of time is determined based on prior network routing statistics.

17. A data processing system, comprising:

a network connection manager to receive a plurality of Internet protocol (IP) addresses from a domain name service (DNS) server for accessing a remote host in response to a DNS query, wherein the plurality of IP addresses include an IP address from a first IP address family and an IP address from a second IP address family, and to sort the plurality of IP addresses based on a list of preferred network interfaces and IP address family support for the list of preferred network interfaces, wherein the list of preferred network interfaces include a first network interface supporting the first IP address family and a second network interface supporting the second IP address family;

a router coupled to the network connection manager to select an IP address from the plurality of IP addresses and a network interface associated with the selected IP address based on the sorting, and to establish a network connection with the remote host via the selected network interface using the selected IP address, wherein the selected IP address is routable to reach the remote host over a network via the selected network interface.

18. The system of claim 17, wherein the list of preferred network interfaces includes at least a WiFi network and a cellular network.

19. The system of claim 18, wherein the list of preferred network interfaces is user configurable and prioritized in a preferred order.

20. The system of claim 17, wherein the plurality of IP addresses includes an IP version 4 (IPv4) address and an IP version 6 (IPv6) address that are associated with the remote host.

21. A computer-implemented method, comprising:
receiving a first IP address from a first DNS server for accessing a remote host in response to a DNS query;
determining whether the first IP address is routable over a preferred network;
delaying a predetermined period of time to receive a second IP address from the first DNS server or a second DNS server, if the first IP address is not routable over the preferred network; and
establishing a network connection with the remote host using the second IP address and a network protocol associated with the second IP address, wherein the second IP address is routable to reach the remote host over the preferred network via a network interface associated with second IP address.

22. A non-transitory computer-readable medium having instructions stored therein, which when executed by a computer, cause the computer to perform a method, the method comprising:
receiving a first IP address from a first DNS server for accessing a remote host in response to a DNS query;
determining whether the first IP address is routable over a preferred network;
delaying a predetermined period of time to receive a second IP address from the first DNS server or a second DNS server, if the first IP address is not routable over the preferred network; and
establishing a network connection with the remote host using the second IP address and a network protocol associated with the second IP address, wherein the second IP address is routable to reach the remote host over the preferred network via a network interface associated with second IP address.

23. A data processing system, comprising:
a network connection manager to receive a first IP address from a first DNS server for accessing a remote host in response to a DNS query; and
a router coupled to the network connection manager to determine whether the first IP address is routable over a preferred network, to delay a predetermined period of time to receive a second IP address from the first DNS server or a second DNS server, if the first IP address is not routable over the preferred network; and to establish a network connection with the remote host using the second IP address and a network protocol associated with the second IP address, wherein the second IP address is routable to reach the remote host over the preferred network via a network interface associated with second IP address.

* * * * *